A. H. RAWITZER.
PNEUMATIC TIRE PROTECTOR.
APPLICATION FILED NOV. 9, 1911.
1,029,027.
Patented June 11, 1912.
2 SHEETS—SHEET 1.
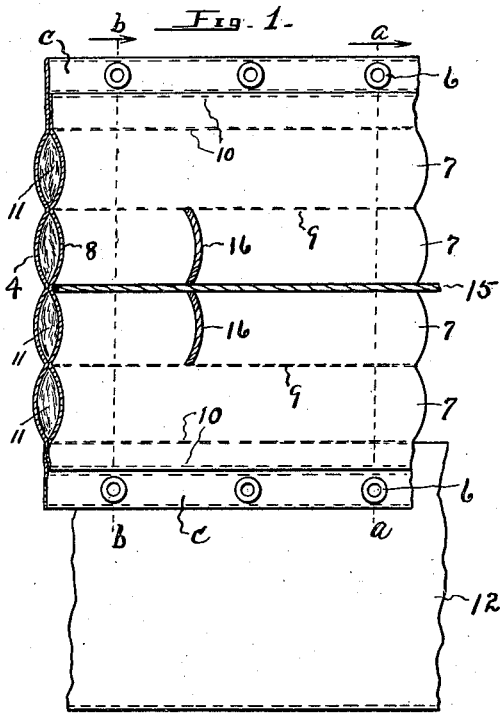
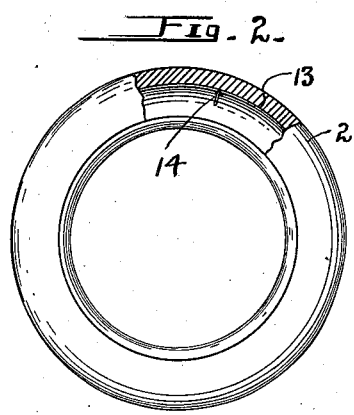
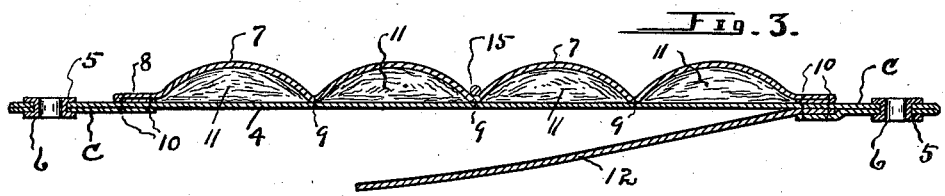
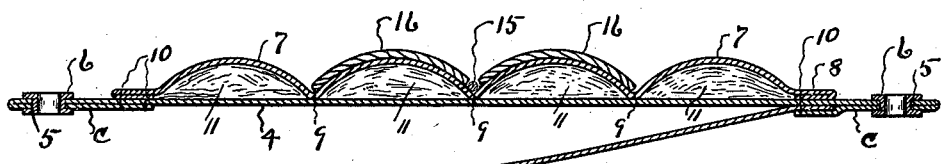

A. H. RAWITZER.
PNEUMATIC TIRE PROTECTOR.
APPLICATION FILED NOV. 9, 1911.

1,029,027.

Patented June 11, 1912.

2 SHEETS—SHEET 2.

UNITED STATES PATENT OFFICE.

ALBERT H. RAWITZER, OF OMAHA, NEBRASKA.

PNEUMATIC-TIRE PROTECTOR.

1,029,027. Specification of Letters Patent. Patented June 11, 1912.

Application filed November 9, 1911. Serial No. 659,313.

*To all whom it may concern:*

Be it known that I, ALBERT H. RAWITZER, a citizen of the United States, residing at Omaha, in the county of Douglas and State of Nebraska, have invented certain new and useful Improvements in Pneumatic-Tire Protectors, of which the following is a specification.

This invention relates to improvements in pneumatic tire protectors, and has for its object to provide an armor for the inner, inflatable tire of vehicle wheels, and more particularly of automobile wheels.

The invention has for its object, broadly, to provide a simple and comparatively inexpensive, flexible belt which may be disposed between the outer casing and the inner tire, so constructed that it may be compressed to occupy a limited space therebetween, said belt preferably to be constructed of canvas, and to provide a plurality of connected, longitudinal compartments, each containing a packing of cotton or similar fibrous material tending to resist cutting or perforation of the inflatable tire, to avoid "blow-outs" or ruptures thereof.

The invention also has reference to a construction of parts tending to prevent a transverse movement of the belt, and to prevent a longitudinal or "creeping" movement thereof while in engagement with the casing and with the inflatable tire.

The invention consists of the novel construction, combination and arrangement of parts as described herein and claimed, and as illustrated in the accompanying drawing, wherein—

Figure 1 is a perspective view in transverse section, showing the outer side of a portion of the endless armor belt, the eyelet or bushing-shield being drawn outwardly to show relative position of parts. Fig. 2 is a side view, partly broken and in section, of the outer casing. Fig. 3 is a sectional view on line *a a* of Fig. 1, the eyelet-shield being disposed below the armor belt. Fig. 4 is a somewhat similar view to that shown in Fig. 3, the section being on line *b b* of Fig. 1. Fig. 5 is a view in transverse section of the armor belt, the pneumatic tire and the outer casing, the tire being partly distended. Fig. 6 is a plan view, showing the armor belt when mounted upon the tire. Fig. 7 is a somewhat similar view to that shown in Fig. 5, illustrating the provision of devices to prevent longitudinal movement or "creeping" of the armor belt.

Referring now to the drawing for a more particular description, numeral 1 indicates an inflatable, pneumatic tire, usually constructed of rubber (Figs. 5, 7), the outer casing or tread and the cushion being respectively indicated at 2 and 3.

To prevent "blow-outs" or rupture of the tire, occasioned generally by puncture or other injury of the casing, the endless belt or armor herein shown is employed. It is constructed by use of an inner, endless, canvas strip 4 (Figs. 3, 4), provided near its edges with eyelets 5 carrying metallic bushings 6; longitudinal, substantially parallel compartments or envelops 7 being provided by means of an outer canvas strip 8 secured to strip 4 by lines of stitching 9 between each compartment, and lines of stitching 10 near the outer edges of the outer compartments. The compartments are filled with packing 11 of fibrous material adapted to resist the passage therethrough of nails, glass or any substance which might otherwise penetrate, cut or injure the pneumatic tire, and fillers of raw cotton have been used to advantage for each packing.

To provide a strong construction, strips 4 and 8 have been folded or doubled near their edges, as best shown in Figs. 3 and 4, and are firmly held together by suitable stitching, these parts providing longitudinal terminals or wings *c* of the belt within which the eyelets 5 are formed. Upon the inner side near one of the edges of strip 4, inwardly of bushings 6 is secured the endless, canvas strip 12, useful as a shield, as hereinafter described, to prevent abrasion of the pneumatic tire from the metallic parts or bushings of the eyelets.

Means are employed and will now be described, tending to prevent "bunching" of the fibrous filling material 11, or buckling of the belt, and to prevent a transverse or a longitudinal movement of the belt with reference to the casing and the inner tire. At the transverse middle, in the inner wall of casing 2, is formed the annular groove 13, and at longitudinal intervals in said wall, opening upon groove 13, are formed the transverse grooves 14. Firmly secured at the transverse middle, upon the outer side of the armor belt, between the inner pair of compartments 9, is the endless contact-member 15.

At 16 are indicated short contact-members disposed transversely upon and at longitudinal intervals of the belt and firmly secured thereto, their inner ends abutting on member 15. Members 15 and 16 may be constructed of leather, or closely woven cord or rope may be employed to advantage, and they may be secured to the belt by stitching, overcasting, or other suitable means.

In operation, the inner tire may be disposed within the armor, and when the tire is placed in the casing, contact-members 15 and 16 will engage, respectively, within channels or grooves 13 and 14, to operate as detents or lugs, and the adjacent ends or edges of the belt may be connected or laced by strands 17 (Figs. 5, 7,) engaging within the eyelets or metallic bushings 6; the wing or strip 12 being disposed between the inner tire and said eyelets and thereby preventing abrasions of the tire from the metallic bushing of said eyelets. By reason of the engagement of member 15 with groove 13, a transverse movement of the belt is prevented, and the middle of the belt will be maintained adjacent to the transverse middle of the casing; and the engagement of members 16 within the transverse grooves 14 prevents a longitudinal movement or "creeping" of the belt with reference to the casing; also these features prevent "bunching" or buckling of the fibrous material within the compartments. When the inner tire has been inflated, its outward pressure reduces the thickness of compartments 7, and the fibrous material of all of the compartments will substantially resist ordinary cuts, abrasions or punctures.

It is considered that shield 12 is of importance in connection with the lacing. While the outward pressure of the tire when inflated is very great, it will be adequately resisted by the lacing 17. In order that the lacing may be held in the eyelets it is quite necessary that the metallic bushing be employed as described, and unless the shield is provided, the inner tire, by reason of continued vibration will become worn and injured from contact with the metallic parts. By its use, however, the tire will be protected in this respect, and "blow-outs" or ruptures of the tire will be prevented.

It will be noted that the connected compartments of the belt and the arrangement of lacing mentioned coöperate to circumscribe the inflatable tire. If the lacing is drawn taut, the belt and lacing will resist the outward pressure of the tire, when the latter is inflated, in a degree to prevent any longitudinal movement of the tire with reference to the belt, and this is a desirable feature since there should be no relative longitudinal movement of the casing, tire or belt.

Having fully described the several parts and their uses, a further explanation relating to operation is not necessary.

What I claim as my invention and desire to secure by Letters Patent is,—

1. An internal armor for double tube pneumatic tires comprising in combination with a tire casing having an inner peripheral recess and an inner tube, a tubular body member made of two separated pieces of fabric quilted longitudinally throughout its length, means for securing the edges of said body together, a longitudinally disposed contact member lying partly in said inner peripheral recess of the tire casing and partly in the groove between two of the quilted portions of the tubular body member.

2. An internal armor for double tube pneumatic tires comprising in combination with a tire casing having an inner longitudinal recess and transverse grooves, a tubular body member made of two separated pieces of fabric quilted longitudinally throughout its length, means for securing the edges of said body together, a longitudinally disposed contact member lying partly in said inner peripheral recess of the tire casing and partly in the groove between two of the quilted portions of the tubular body member, and transversely extending contact members carried by the tubular body member which engage in said transverse grooves.

In testimony whereof I have affixed my signature in presence of two witnesses.

ALBERT H. RAWITZER.

Witnesses:
HIRAM A. STRUGES,
L. M. THOMAS.

Copies of this patent may be obtained for five cents each, by addressing the "Commissioner of Patents, Washington, D. C."